G. C. SWEET & C. W. WEISS.
CONTROLLING DEVICE FOR INTERNAL COMBUSTION ENGINES.
APPLICATION FILED JAN. 22, 1909.
949,858.
Patented Feb. 22, 1910.
8 SHEETS—SHEET 1.
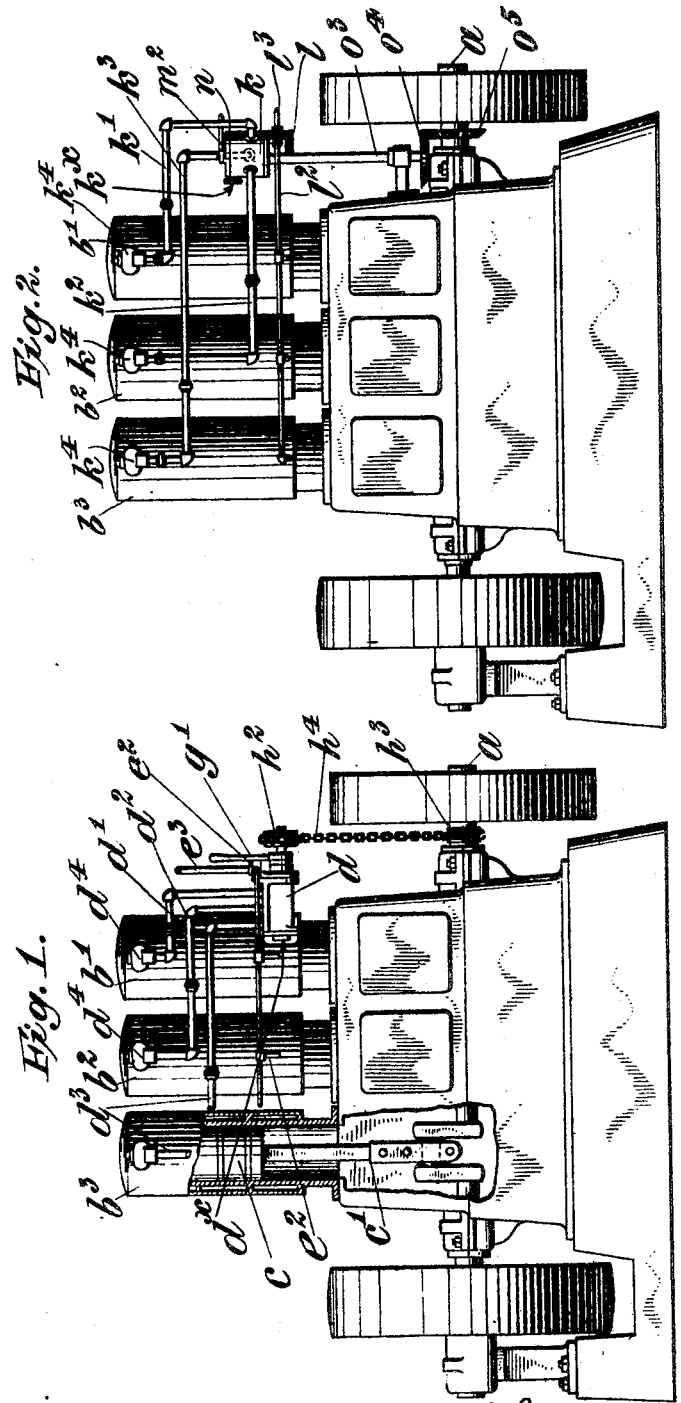

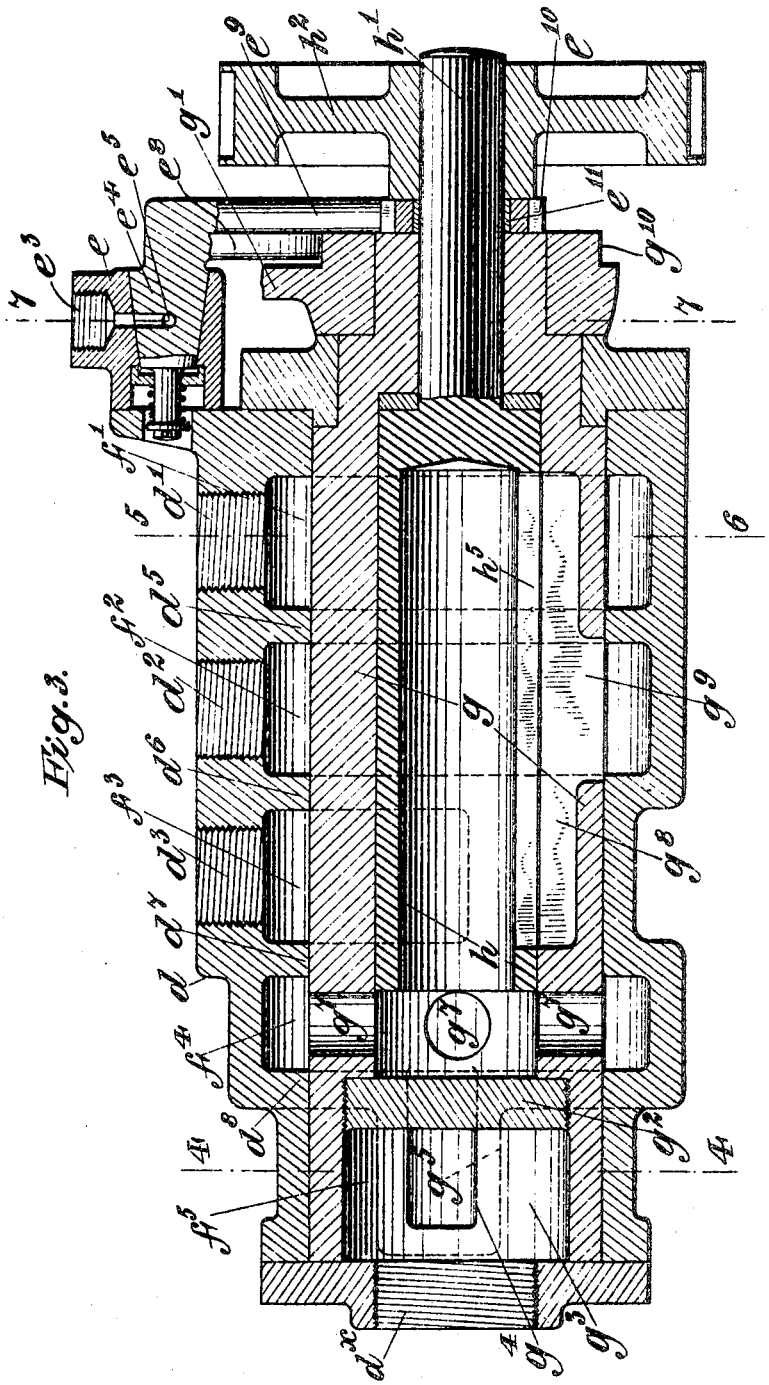

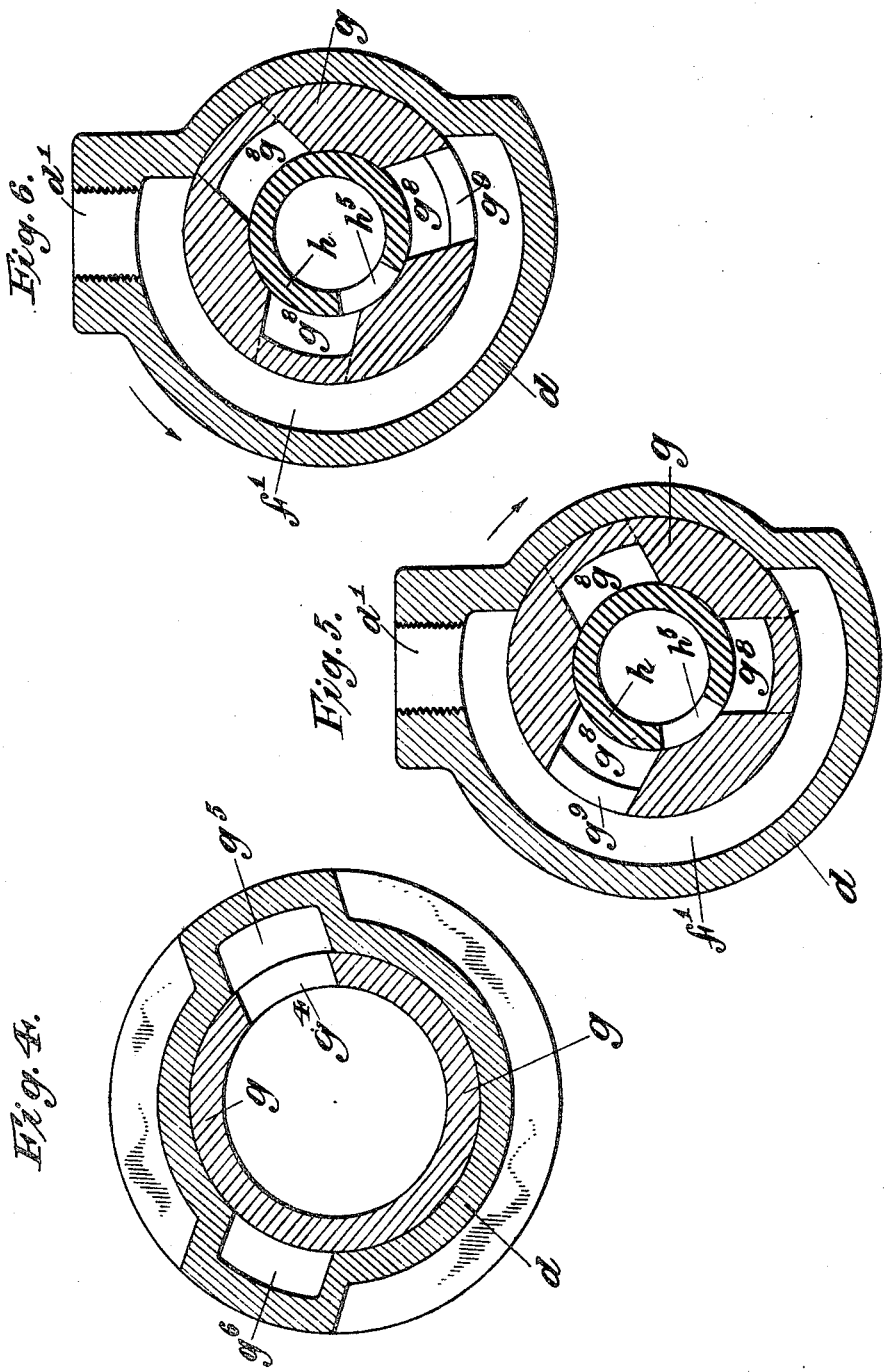

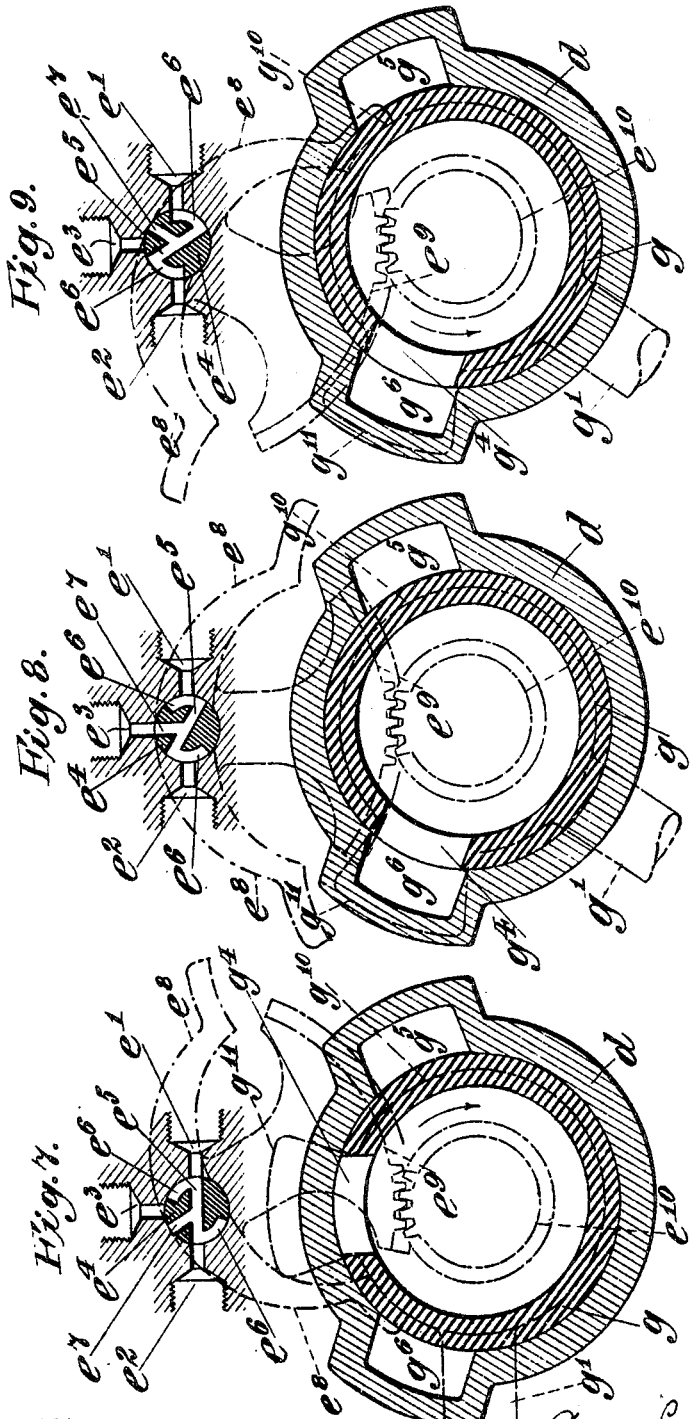

G. C. SWEET & C. W. WEISS.
CONTROLLING DEVICE FOR INTERNAL COMBUSTION ENGINES.
APPLICATION FILED JAN. 22, 1909.
949,858.
Patented Feb. 22, 1910.
8 SHEETS—SHEET 5.
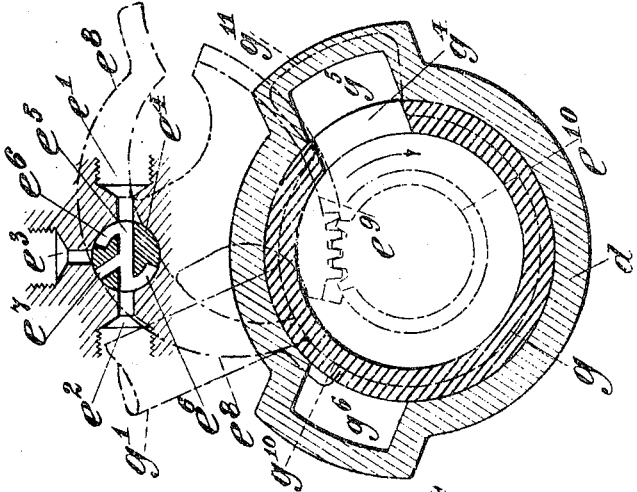
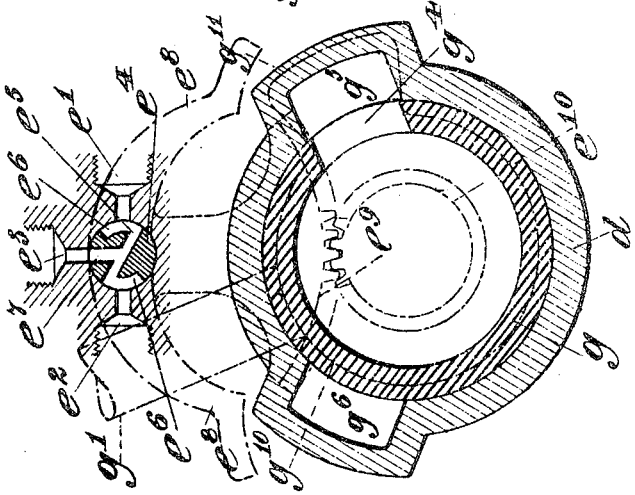
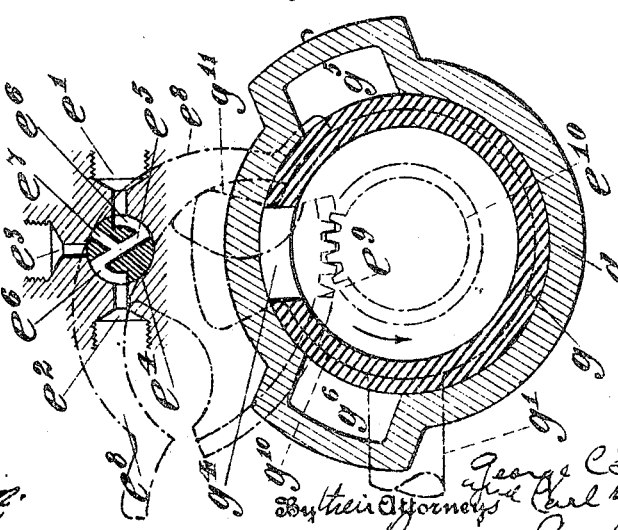

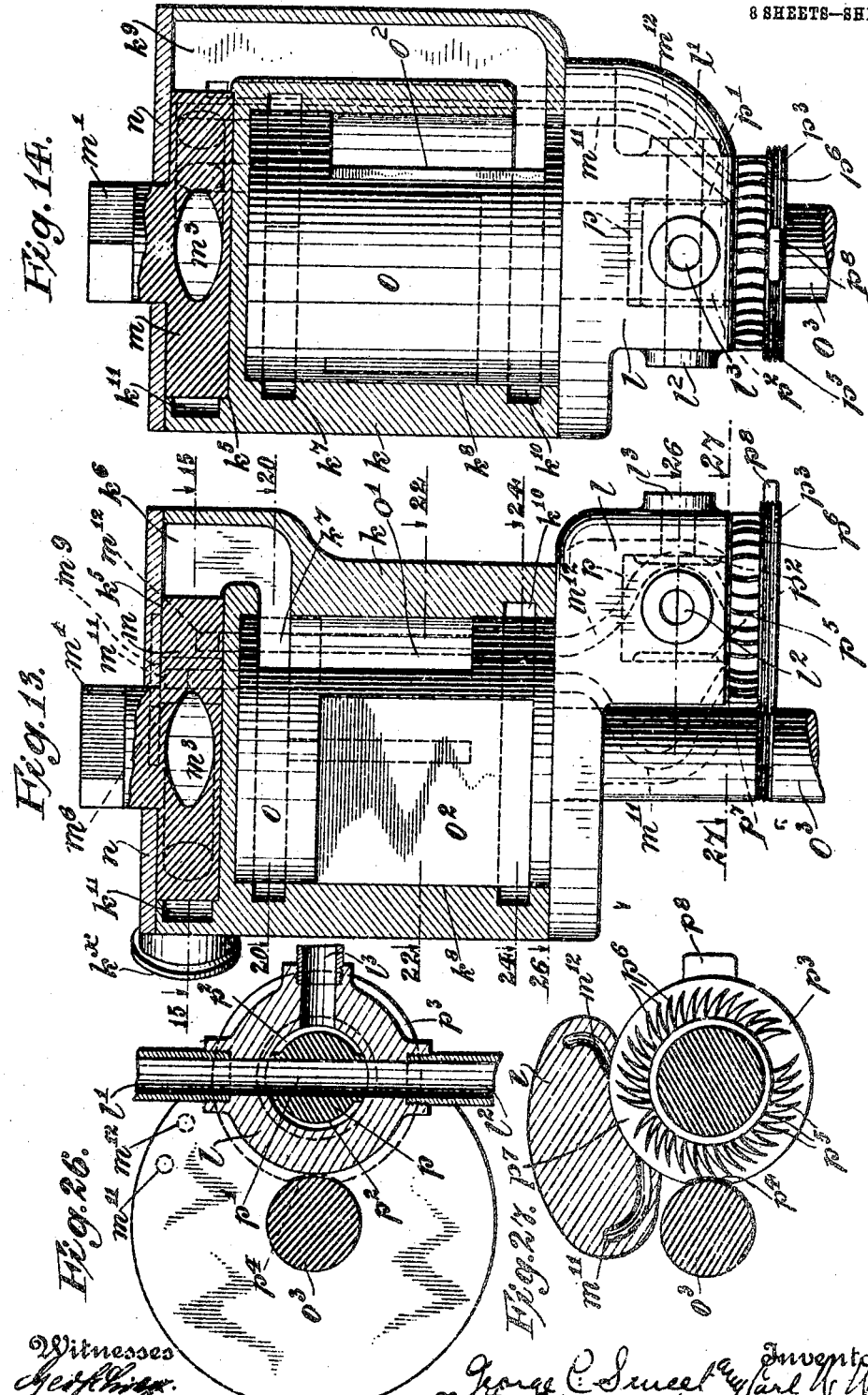

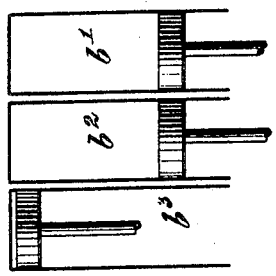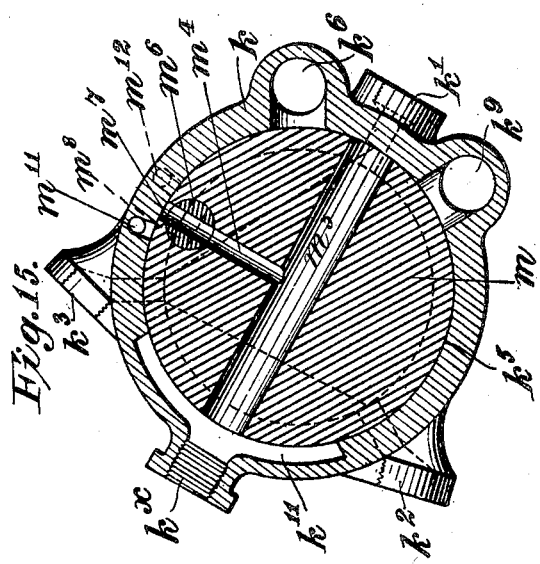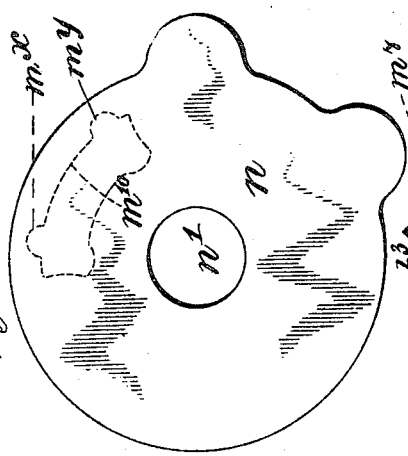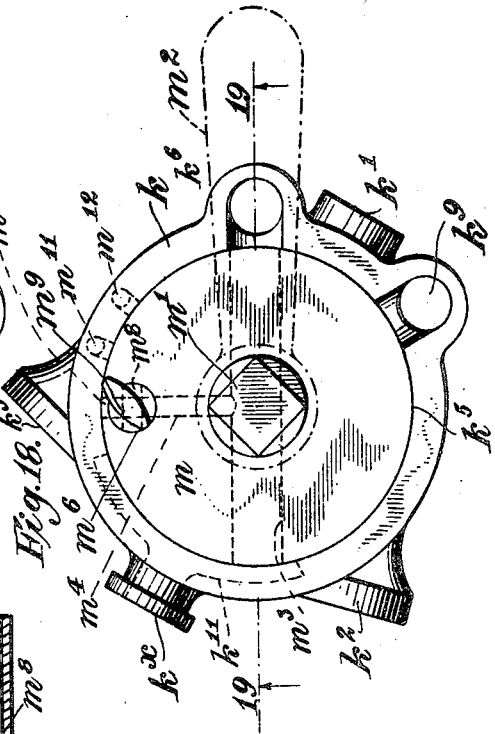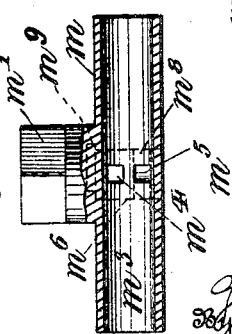

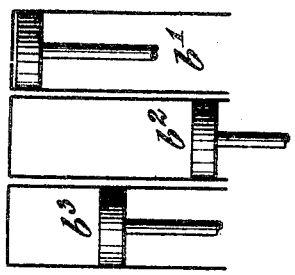
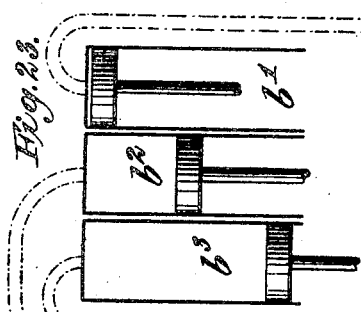
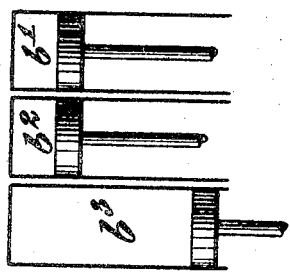
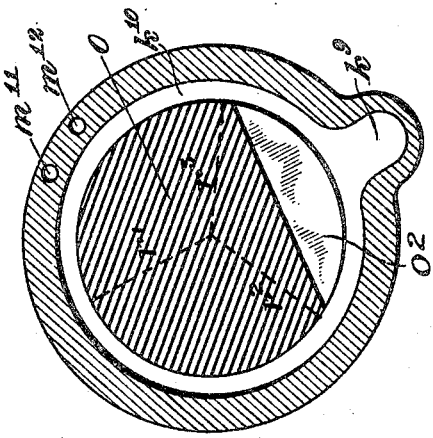
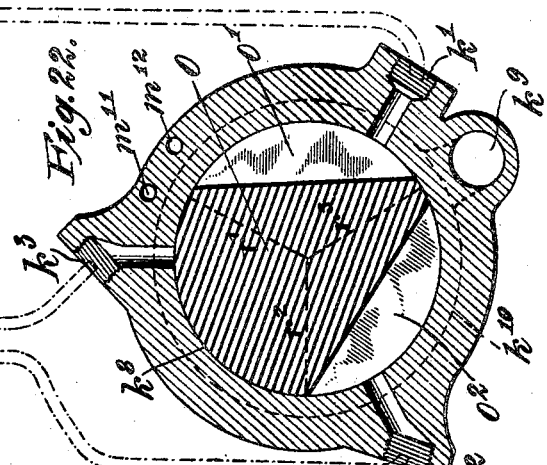
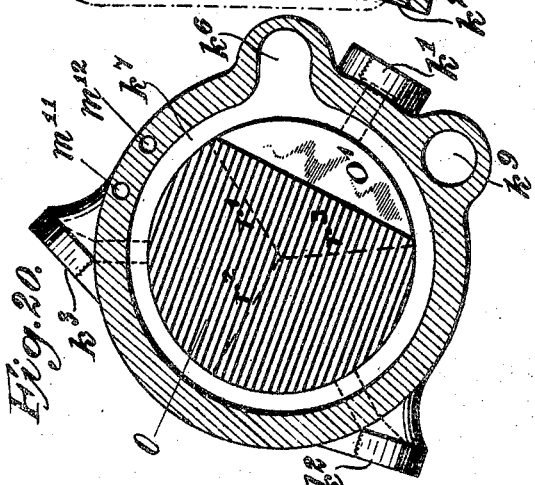

UNITED STATES PATENT OFFICE.

GEORGE C. SWEET, OF WATERLOO, AND CARL W. WEISS, OF NEW YORK, N. Y.

CONTROLLING DEVICE FOR INTERNAL-COMBUSTION ENGINES.

949,858.  Specification of Letters Patent.  Patented Feb. 22, 1910.

Application filed January 22, 1909. Serial No. 473,627.

*To all whom it may concern:*

Be it known that we, GEORGE C. SWEET, a citizen of the United States, residing at Waterloo, in the State of New York, and CARL W. WEISS, a citizen of the United States, residing in the borough of Manhattan, of the city of New York, in the State of New York, have invented certain new and useful Improvements in Controlling Devices for Internal-Combustion Engines, of which the following is a specification, reference being had to the accompanying drawings, forming a part hereof.

This invention relates to devices for controlling internal combustion engines, that is, to devices for determining the direction of movement and for starting and stopping.

In general the improved devices are analogous to devices for controlling steam engines, the admission of air under pressure from some suitable source of supply being suitably regulated and controlled with respect to the piston or pistons upon which it acts, but the devices are specially adapted to the conditions which exist in internal combustion engines.

The invention is particularly concerned with the proper control of the supply of fuel to the engine in connection with the admission of air under pressure in starting, stopping or reversing the engine, but is also concerned generally with the improvement of controlling devices of the character referred to.

The invention will be more fully explained hereinafter with reference to the accompanying drawings in which it is illustrated and in which—

Figures 1 and 2 are views in elevation of engines equipped with different embodiments of the invention. Fig. 3 is a detail view, on a larger scale and in vertical longitudinal section, of the controlling devices shown in Fig. 1. Fig. 4 is a view in section on the plane indicated by the line 4—4 of Fig. 3. Figs. 5 and 6 are views in section on the plane indicated by the line 5—6 of Fig. 3, Fig. 5 showing the parts in position for running forward and Fig. 6 showing the parts in position for running backward. Figs. 7–12 are views in section, partly through the oil controlling device on the plane indicated by the line 7—7 of Fig. 3 and partly through the vestibule of the air controlling device on the plane indicated by the line 4—4 of Fig. 3, with some parts indicated by dotted lines, showing the parts in different positions which they assume under different conditions. Fig. 13 is a detail view, on a larger scale, partly in vertical central section, of the controlling device shown in Fig. 2. Fig. 14 is a view similar to that of Fig. 13, but on a section plane at right angles to that of Fig. 13. Fig. 15 is a view in section on the plane indicated by the line 15—15 of Fig. 13. Fig. 16 is a diagrammatic view indicating positions of the three pistons of a three-cylinder engine, such as that shown in Figs. 1 and 2, which correspond to the positions of the parts shown in Fig. 15. Fig. 17 is a top view of the cap plate shown in Figs. 13 and 15. Fig. 18 is a similar view of the controlling devices shown in Figs. 13 and 14 with the top plate removed. Fig. 19 is a detail view of the rotatable disk shown in Figs. 15 and 18, partly in section on the plane indicated by the line 19—19 of Fig. 18. Fig. 20 is a view in section on the plane indicated by the line 20—20 of Fig. 13. Fig. 21 is a diagrammatic view illustrating the corresponding positions of the three pistons. Fig. 22 is a view in section on the plane indicated by the line 22—22 of Fig. 13. Fig. 23 is a diagrammatic view, illustrating the corresponding positions of the three pistons, the connection of the several cylinders to the controlling device shown in Fig. 22 being indicated by dotted lines. Fig. 24 is a view in section on the plane indicated by the line 24—24 of Fig. 13. Fig. 25 is a diagrammatic view, illustrating the corresponding positions of the pistons. Fig. 26 is a view in section on the plane indicated by the line 26—26 of Fig. 13. Fig. 27 is a view in section on the plane indicated by the line 27—27 of Fig. 13.

Referring first to the embodiment of the invention illustrated in Figs. 1 and 3–12, it will be seen that the improved controlling device is illustrated as adapted for application to a three-cylinder engine of a well known type, but it will be understood that the invention is equally capable of application to engines having a greater or a smaller number of cylinders and to engines of types different from that shown. The engine illustrated comprises a crank shaft $a$, mounted in suitable bearings in the crank case and provided with a fly wheel and a pulley, and cylinders $b'$, $b^2$ and $b^3$, in each of which is a piston $c$ connected by a rod or pitman $c'$ with the corresponding crank of the crank shaft $a$. The three cranks of a three-cylinder engine will of course be disposed 120° apart. The controlling device, indicated at $d$, may be located at any convenient point, either upon the engine frame or elsewhere, and may receive its supply of air under pressure from any suitable source, the inlet port being indicated at $d^x$. Air is conducted from the controlling device to the several cylinders through suitable connections $d'$, $d^2$ and $d^3$, each of which is provided with a check valve, as at $d^4$, to prevent the movement of air or gases backward from the cylinders into the controlling device. Oil or other fuel is supplied to the controlling device from any suitable source, through an oil controlling valve $e$. The oil inlet to the controlling valve is indicated at $e'$, the connections by which the oil is conducted to the cylinders at $e^2$ and an oil return or by-pass through which oil is returned to the source of supply, when it is cut off from the cylinders, at $e^3$.

The air controlling device is, generally speaking, a rotary valve, but it has certain features which adapt it for use upon an internal combustion engine. As shown in the figures of the drawings referred to, it comprises a generally cylindrical shell $d$ having connections to the several cylinders and having internal flanges $d^5$, $d^6$, $d^7$ and $d^8$, which form chambers $f'$, $f^2$, $f^3$, $f^4$ and $f^5$. Within the shell $d$, and fitting closely in the several flanges, is a rotatable sleeve $g$ which carries at one end the controlling lever $g'$. Near the other end there is seated in the bore of the sleeve $g$ a disk or closure $g^2$ which forms in the outer end of the sleeve a vestibule $g^3$ which communicates directly with the air supply through the inlet $d^x$. In the wall of the vestibule $g^3$ is a port $g^4$ which admits air to one or the other of two longitudinal channels $g^5$, $g^6$, formed in the shell $d$ or is covered by the wall between such channels to prevent the admission of air, according to the position of the controlling lever $g'$. The channels $g^5$, $g^6$, communicate with the circumferential chamber $f^4$ from which air is admitted through ports $g^7$ in the sleeve $g$ to the interior of the sleeve $g$.

Fitted rotatably within the sleeve $g$ is a sleeve $h$ which is carried by a spindle $h'$ and is rotated synchronously with the crank shaft $a$ of the engine through any suitable means, as through chain wheels $h^2$, $h^3$ and a chain $h^4$. In the sleeve $h$ is a long port $h^5$ through which air is delivered, as the sleeve $h$ rotates, in succession to three longitudinal channels $g^8$ which are angularly disposed in correspondence with the three cranks of the crank shaft $a$. In the wall of each of the channels $g^8$ is a port $g^9$, the three ports being distributed longitudinally so as to register with the corresponding circumferential chambers or channels $f'$, $f^2$ and $f^3$ which communicate respectively with the several cylinders $b'$, $b^2$ and $b^3$. As will now be understood, by partial rotation of the sleeve $g$ in one direction or the other, the time of communication between the air supply and the several cylinders is advanced or retarded with respect to the position of the pistons in such cylinders or is angularly advanced or retired with relation to the cranks on the crank shaft, the continuously rotating sleeve $h$ providing means for effecting the delivery of air to the several cylinders in proper succession. The provision of the port $g^4$ in the vestibule of the air supply permits air to be admitted in either of the two extreme positions while preventing the admission of air during the shifting of the sleeve from one extreme position to the other. The amplitude of the angular movement of the controlling lever $g'$ and of the sleeve $g$, from one extreme to the other, is about 120°, which is the angular difference in position of one crank from another. Obviously, in an engine having three or more cylinders, at any given time or in any given position of the crank shaft, at least one of the pistons will be at some point between the limits of its stroke with its crank in such position that pressure upon the piston will rotate the shaft in a forward direction, while at least one other of the pistons is at the same instant somewhere between the limits of its stroke with its crank in such position that pressure upon the piston will drive the shaft in a backward direction. With the reversing lever $g'$ and the reversing valve or sleeve $g$ in one position the air will therefore be admitted first to that cylinder which has its piston and crank in such position that pressure will drive the shaft forward and through the rotation of the sleeve $h$ in a forward direction the air will be admitted to the several cylinders in succession in such manner and at such time as to continue the forward rotation of the shaft. In the other position of the reversing lever and reversing valve or sleeve air will be admitted first to that cylinder which has its piston and crank in such position that pressure on the piston will drive the shaft in a backward direction and the continued rotation of the valve or sleeve $h$ in the backward direction will distribute the air to the several cylinders in succession in such manner as to continue the backward rotation of the shaft. In an intermediate position of the controlling lever and valve or sleeve $g$ the supply of air to the cylinders is cut off, the port $g^4$ being then between the channels $g^5$ and $g^6$ so that air cannot pass beyond the vestibule.

In the operation of the controlling device as a starting device only it is desirable that the supply of fuel, such as oil, alcohol or other suitable fuel to the cylinders be cut off except when the controlling device is in position for running, but in the operation of the controlling device as a reversing device it is necessary that the supply of fuel oil be cut off during the shifting of the controlling mechanism and when the parts are in position other than those occupied during running forward or running backward, in order that explosions at the wrong time may be prevented. To accomplish this result which is desirable in the one case and is necessary in the other case, provision is made whereby either the oil valve or the air valve is actuated either directly or indirectly by or through or with the movement of the other of said valves. In the arrangement shown in Figs. 1 and 3–12 the oil controlling device is operated mechanically through the movements of the controlling lever and of the spindle $h'$ of the distributing valve. The valve plug or spindle $e^4$ has a diametrical channel $e^5$ with circumferential elongated ports $e^6$ at its ends which are adapted to register with the oil inlet $e'$ and oil outlet $e^2$ and a branch channel $e^7$ which is adapted to register with the oil return or by-pass $e^3$. The stem of the valve plug or spindle $e^4$ carries a yoke $e^8$, the shape of which is shown by dotted lines in Figs. 7–12, which is adapted to coöperate with the hub $g^{10}$ of the controlling lever $g'$ and with a block or lug $g^{11}$ which is carried by the hub $g^{10}$. The stem of the valve plug or spindle $e^4$ also carries a gear segment $e^9$ which meshes with a pinion $e^{10}$ mounted frictionally, through a friction ring $e^{11}$, on the spindle $h'$, so that the valve plug or spindle $e^4$ will be partially rotated, in one direction or the other, according to the direction of rotation of the spindle $h'$ and therefore of the crank shaft $a$, whenever and to the extent to which the valve plug is at the time free to be moved. The movement of the valve plug is limited by the co-action of the yoke $e^8$ with the block or lug $g^{11}$ and by the co-action of the extremities of the yoke $e^8$ with the hub $g^{10}$ of the controlling lever $g'$.

The operation of the oil controlling device is illustrated in Figs. 7–12. In Fig. 7 it may be assumed that the engine is running forward as indicated by the arrow near the dotted lines which indicate the valve or sleeve $h$ and the pinion $e^{10}$. Through the frictional engagement of the gear $e^{10}$ with the spindle $h'$ and the engagement of the segment $e^9$ with the piston, the valve plug $e^4$ is carried to and maintained in the position represented, in which the diametrical channel $e^5$ registers with the ports $e'$ and $e^2$ so that oil is permitted to flow through to the cylinders. The controlling lever $g'$ is then in its median position and the sleeve or valve $g$ is so positioned as to cut off the flow of air to the cylinders from the reservoir or supply which is provided for the purpose of starting or reversing the engine, the cylinders then taking the air which forms with the oil the explosive mixture from the crank chamber or other usual source of supply.

Fig. 8 shows the positions of the parts preliminary to reversing, the engine still running forward or standing still. The controlling lever $g'$ is moved to its lowest position and the block $g^{11}$ on the hub thereof, coöperating with the left hand arm of the yoke $e^8$, throws the yoke to its horizontal or median position, bringing the channel $e^7$ of the oil cock into registration with the return channel $e^3$, in which position oil is not supplied to the engine but circulates through the by-pass. If the engine be standing still at this time there is no tendency to move the oil cock yoke through the frictional device, but if the engine is running forward the tendency of the frictional device to move the oil cock yoke back into the position represented in Fig. 7 is resisted through the resting of the left hand end of the yoke upon the shoulder of the block $g^{11}$. The movement of the controlling lever and sleeve $g$ to the position shown in Fig. 8 admits air from the reservoir to the controlling device and shifts the air connections to reversing position, the air starting the engine in the reverse direction, as indicated by the arrow on Fig. 9. This movement of the spindle $h'$ in the reverse direction, through the frictional device, throws the oil cock slowly to the position thereof represented in Fig. 9, the movement thereof being limited by contact of the right hand end of the yoke through the hub $g^{10}$. This movement of the oil cock shuts off the oil return or by-pass and admits oil from the supply to the cylinders. The rotation of the sleeve $h$ continues the distribution of the air to the cylinders in succession in regular order. As soon as the engine is brought fairly up to speed by the air from the reservoir, the controlling lever $g'$ is moved back to its horizontal or median position, as shown in Fig. 10, thereby shutting off air from the reservoir. The engine then continues to run backward, the cylinders taking air from the crank shaft or other usual source of supply when the engine is running normally.

If with the parts in the position represented in Fig. 10, the engine either running or standing still, it is desired to cause the engine to run forward, the controlling lever is moved to its highest position, as shown in Fig. 11, again admitting air from the reservoir and shifting the valve or sleeve $g$ so as to admit air to the cylinders in regular order and properly timed with respect to the cranks and pistons for running forward. During this movement of the controlling lever the block $g^{11}$, through contact with the right hand arm of the yoke $e^8$, throws the yoke and oil cock into the position represented in Fig. 11, placing the channel $e^7$ in registration with the return $c^3$ so that oil is no longer supplied to the engine. The continued rotation of the spindle $h'$ in the forward direction, as indicated by the arrow in Fig. 12, through the frictional device, throws the oil cock yoke over into the position represented in Fig. 12, its movement being limited by contact of the left hand arm of the yoke with the hub $q^{10}$, moving the oil cock into position to cut off the oil return or by-pass and admit oil directly from the supply to the cylinder.

It will be understood that the channels in the oil cock are so positioned with respect to the actuating device that the oil supply to the engine is cut off before the air connections are moved sufficiently to admit air to the cylinders. There is, therefore, no fuel oil in the engine cylinders at this time and therefore no explosion can take place therein during the shifting. The admission of oil to the cylinders takes place only after the movement of the engine in the desired direction has been begun by air pressure alone and when the air connections have been shifted so as to continue the movement of the engine in the desired direction, after which the oil is admitted and the driving of the engine is continued by explosions within the cylinders, the air which mixes with the fuel oil being taken from the usual source of supply when the controlling lever has been moved back to its median or normal position to cut off the supply of air from the reservoir.

In the embodiment of the invention shown in Figs. 2 and 13-27, the engine to which the controlling device is applied is for convenience shown as of the same character and type as that shown in Fig. 1, having a crank shaft $a$ mounted in suitable bearings in the crank case and provided with a fly wheel and a pulley, and cylinders $b'$, $b^2$ and $b^3$, in each of which is a piston $c$ connected by a rod or pitman $c'$ through the corresponding crank of the crank shaft $a$. The controlling device, indicated at $k$, may also be located at any convenient point and may receive its supply of air under pressure from any suitable source, the inlet being indicated at $k^x$. Air is conducted from the controlling device to the several cylinders through suitable connections $k'$, $k^2$ and $k^3$, each of which, as before, is provided with a check valve $k^4$. Fuel oil, also, is supplied to the controlling device from any suitable source through an oil controlling valve $l$, the oil inlet being indicated by dotted lines at $l'$ in Fig. 14, the connections by which the oil is conducted to the cylinders at $l^2$, and an oil return or by-pass, through which oil is returned to the source of supply when it is cut off from the cylinders, at $l^3$. The air controlling device, in this construction, also, is in the nature of a rotary valve, but of a different form from that previously described. As shown it comprises a generally cylindrical shell $k$ having a chamber $k^5$ which communicates by a port and channel $k^6$, with a circumferential channel $k^7$ in one end of the chamber $k^8$ and, by a port and channel $k^9$, with the circumferential channel $k^{10}$ at the other end of the valve chamber $k^8$. The inlet $k^x$ merges into an elongated mouth or channel $k^{11}$ in the chamber $k^5$, in which chamber is mounted rotatably a disk-like valve body or plug $m$ having a spindle $m'$ adapted to receive the controlling lever $m^2$ and a diametrical channel $m^3$ which is adapted to establish connection between the air inlet $k^x$ and one or the other, according to the direction in which the engine is to be driven, of the channels $k^6$ and $k^9$ or to cut off the supply of air to the controlling device. The spindle $m'$ projects through an opening $n'$ in the cover plate $n$, to receive the handle $m^2$. In the valve chamber $k^8$ is fitted the distributing valve plug $o$, by which the admission of air to the several cylinders in order is controlled, this valve plug or body also acting, in conjunction with the valve $m$, as a reversing valve. On one side the valve body $o$ is cut away, as at $o'$, from the circumferential channel $k^7$ toward the other end of the valve body but not as far as the circumferential channel $k^{10}$, this cut away portion or chamber $o'$ forming a communication between the channel $k^6$ and the connections $k'$, $k^2$ and $k^3$ as the valve body rotates. The valve body is also cut away, as at $o^2$, from the circumferential channel $k^{10}$ toward the other end of the valve body but not as far as the channel $k^7$, the chamber or cut away portion $o^2$ forming a channel of communication between the channel $k^9$ and the connections $k'$, $k^2$ and $k^3$ to the several cylinders. The angular relation of the channel or chamber $o'$ and the channel or chamber $o^2$ is such that when air is directed by the valve $m$ through the channel $k^6$ into the channel or chamber $o'$, the engine will be driven ahead, and when the air is directed by the valve $m$ through the channel $k^9$ into the channel or chamber $o^2$, the engine will be driven backward. The continued rotation of the valve $o$, in one direction or the other, distributes the air to the several cylinders in regular order. The rotation of the valve $o$ is synchronous with the rotation of the crank shaft $a$ and is effected by any suitable means, as by a shaft $o^3$ having a bevel pinion $o^4$ which engages a bevel pinion $o^5$ on the crank shaft $a$.

As in the case of the embodiment of the invention first described, it is desirable to provide for the cutting off of the supply of oil to the engine when the device is used as a starting device only, until the engine is started by air alone, and it is a practical necessity to cut off the supply of oil to the engine when the device is used as a reversing device, until the engine is started in the proper direction by air alone. This result is accomplished in this form, as in the form previously described, by the automatic operation of either the air valve or the oil valve, either directly or indirectly, by or through or with the operation of the other of said valves. In the form first described the oil was cut off by movement of the air controlling device through suitable mechanical elements. In the present instance, for the purpose of illustrating the nature of the invention and its capability of embodiment in different forms, the oil controlling device is shown as operated by air pressure, the admission of air to the devices which operate the oil cock being controlled by the movement of the valve which admits air to the cylinders. In the construction shown, the valve body or plug $p$ of the oil controlling device $l$ has a diametrical channel $p'$ (see Fig. 26) and is also channeled circumferentially, as at $p^2$, on opposite sides of the diametrical channel $p'$, the channels $p^2$ not, however, uniting with the channel $p'$. Partial rotation of the valve plug may therefore place the oil supply connection $l'$ either in communication with the cylinder connection $l^2$, to deliver oil to the engine, through the diametrical channel $p'$, or it may place the oil supply $l'$ in connection with the oil return $l^3$, through one of the circumferential channels $p^2$, the supply of oil to the engine being then cut off, the supply of oil being in every case cut off before air is admitted, so that the starting is by air alone without explosion. The valve plug or body $p$ carries a friction disk $p^3$ adapted for frictional engagement with the shaft $o^3$. The friction disk is cut away, as at $p^4$, so that the disk shall be out of driving contact with the shaft when the disk is in its normal position. When, however, the disk has been moved from its normal position in either direction, by air pressure, as hereinafter described, the frictional engagement of the disk with the shaft, when the shaft begins to rotate, will rotate the valve plug back to normal position in one direction or the other as the case may be. The valve plug or body $p$ also carries a series of turbine blades $p^5$ faced in one direction and another series of turbine blades $p^6$ faced in the other direction, from the common point $p^7$, the blades being in the same plane. Air under pressure is supplied to one set of blades or the other to give to the oil cock a partial rotation in one direction or the other, the movement being limited by a suitable stop, such as a projection $p^8$ which impinges upon one side or the other of the shaft $o^3$.

The admission of air to one nozzle or the other is controlled by or through the movements of the starting or reversing valve $m$.

As shown in Figs. 15, 18 and 19, the valve body or disk $m$ has two air ways or channels $m^4$ and $m^5$, leading from the main air channel $m^3$ to the periphery of the valve body in different horizontal planes. Located in the valve body $m$ so as to control the channels $m^4$ and $m^5$ is an air cock or valve plug $m^6$ having a channel $m^7$ in the same plane with the channel $m^4$ and a channel $m^8$, shown in dotted lines, in the same horizontal plane as the channel $m^4$. On the upper end of the valve body $m^5$ is an actuator $m^9$ which coöperates with a cam recess $m^{10}$, shown in dotted lines in Fig. 17, in the underside of the cap plate $n$. In the wall of the shell $k$ are formed channels $m^{11}$ and $m^{12}$, with which the channels $m^5$ and $m^6$ register respectively in the movement of the valve body $m$, the channels terminating in the nozzles shown in Fig. 27, by which air under pressure is directed against one set of the turbine blades $p^5$ or against the other set $p^6$.

In the position of the parts shown in Fig. 15, the starting and reversing valve $m$ is in its median or normal position, with the end of the channel $m^3$ closed by the wall of the shell $k$ between the channels $k^8$ and $k^9$ and the channels $m^4$ and $m^5$ closed by the wall of the shell $k$ between the channels $m^{11}$ and $m^{12}$. No air is then admitted to the cylinders from the reservoir, but if the engine be running the air is supplied to the cylinders from the usual source. The oil cock $p$ is then so positioned as to admit oil to the engine, as indicated in Fig. 26. If the engine be either running backward under fuel, the valve $m$ being in mid or normal position, as shown in Fig. 15, or standing still and it be desired to drive the engine ahead the valve $m$ is rotated to the right to admit air from the inlet $k^x$, channel $k^{11}$ and channel $m^3$ to the channel $k^6$ and so to the distributing valve from which it is delivered to the several cylinders in the proper relation to the pistons to effect ahead driving of the engine and therefore ahead rotation of the shaft $o^3$. The first effect of the movement of the valve $m$ is to bring the channel $m^4$, then open, into registration with the channel $m^{11}$ by which air under pressure is directed against the turbine blades $p^5$ and the movement of the oil cock $p$ to shut off the supply of oil or to place the supply connection $l^2$ in communication with the return $l^3$, is effected. When the shaft $o^3$ commences its ahead rotation, the cock is returned to normal position by the frictional engagement of the disk $p^3$ with the shaft and fuel is supplied to the cylinders. As the valve $m$ reaches the limit of its movement to the right the heel of the actuator $m^9$ contacts with the end wall of the recess $m^{10}$ and causes the toe thereof to enter the corresponding lateral recess $m^x$ in the recess $m^{10}$ in the underside of the cap plate $n$. When the engine is fairly at speed the valve $m$ is moved back to its normal or median position and in such movement the toe of the actuator $m^9$ engages the recess $m^x$ and the air cock $m^6$ is turned so as to close the channel $m^4$ and to open the channel $m^5$. If then it be desired to again change the direction of running of the engine the reversing valve is rotated to the left and the first effect is to admit air through the channels $m^5$ and $m^{12}$ to the turbine and starting the rotation thereof in a direction to cut off the fuel supply to connection $l^2$ and open the overflow through channels $p^2$ to return $l^3$. The fuel supply to the engine is then shut off until the engine, and with it the shaft $o^3$, reverses. Then the frictional disk $p^3$ brings the cock $p$ back to normal position and fuel is again supplied to the cylinders. When lever $m^2$ reaches the limit of its movement to the left the heel of the actuator $m^9$ strikes the other end of the cam surface $m^{10}$. The toe of the actuator engages in recess $m^y$ and the air cock $m^6$ is turned so that on the return of the valve $m$ to normal position the channel $m^5$ is closed, and channel $m^4$ opened. It is thus impossible to change the direction of rotation of the engine without first cutting off the fuel from the cylinders. To enable the relation of the valve body $o$ to the working parts of the engine to be readily understood, the relative positions of the cranks of a three-cylinder engine have been indicated by dotted lines $r'$, $r^2$ and $r^3$ on Figs. 20, 22 and 24.

It will be understood that the invention is capable of embodiment in different structures as may be required, for example, by different types of internal combustion engines, whether two-cycle or four-cycle, and whether having three or more or less cylinders, and that the invention is not restricted to the details of construction and arrangement shown and described herein with respect to either of the illustrative embodiments thereof.

We claim as our invention:

1. Controlling mechanism for internal combustion engines, comprising an air-valve to supply or cut off air only to or from the engine for starting or reversing and independent of means for supplying air to the engine as an element of the explosive mixture, a fuel-valve independent of the air-valve to supply or cut off fuel directly to or from the engine, and means whereby one of said valves is operated automatically through the movement of the other of said valves.

2. Controlling mechanism for internal combustion engines, comprising an air-valve to supply or cut off air only to or from the engine for starting or reversing and independent of means for supplying air to the engine as an element of the explosive mixture, a fuel-valve independent of the air-valve to supply or cut off fuel to or from the engine, manual means to operate one of said valves and means whereby the other of said valves is operated automatically through the movement of the last mentioned valve.

3. Controlling mechanism for internal combustion engines, comprising an air-valve to control the supply of air only to the engine for starting and reversing and independent of means to supply air to the engine as an element of the explosive mixture, manual means for operating the same to start or stop the engine, and a fuel-valve independent of the air-valve but automatically operated through the operation of the air-valve to admit or cut off the supply of fuel to the engine.

4. Controlling mechanism for internal combustion engines, comprising an air-valve to control the supply of air only to the engine for starting or reversing and independent of means to supply air to the engine as an element of the explosive mixture, manual means for operating the same to start or stop the engine, a fuel-valve independent of the air-valve to admit or cut off the supply of fuel to the engine, and means actuated through the movement of the air-valve to effect the movement of the fuel-valve.

5. Controlling mechanism for internal combustion engines, comprising a reversing-air-valve and connections to admit air in proper relation to start the engine in one direction or the other and a fuel-valve automatically operated through the operation of the reversing valve to admit fuel to the engine while the reversing-valve is in normal position and to cut off the supply of fuel during the shifting of the reversing-valve.

6. Controlling mechanism for internal combustion engines, comprising a reversing-air-valve and connections to admit air in proper relation to start the engine in one direction or the other, a fuel-valve to admit fuel to the engine while the reversing-valve is in normal position and to cut off the supply of fuel during the shifting of the reversing-valve, and means actuated by the movement of the air-valve to effect the operation of the fuel-valve.

7. Controlling mechanism for internal combustion engines, comprising a rotary air-valve to control the supply of air only to the engine for starting or reversing, and independent of means to supply air to the engine as an element of the explosive mixture, manual means for controlling the same to start or stop the engine, and a rotary fuel-valve independent of the air-valve but automatically operated through the movement of the air-avlve to admit or cut off the supply of fuel to the engine.

8. In an internal combustion engine, the combination of a valve and connections to admit air to the engine in proper relation to continue the movement thereof, means whereby said valve is operated in synchronism with the engine, a manually operated valve and connections to shift the time of admission of air to the first valve whereby the engine may be started in either direction, and a fuel-valve automatically operated through the operation of the manually operated valve to admit or cut off the supply of fuel to the engine.

9. In an internal combustion engine, the combination with a plurality of cylinders, of a distributing valve operated in synchronism with the engine and connections to admit air to the cylinders in order, a fuel-valve and connections independent of the distributing valve and its connections to supply fuel to the several cylinders, means whereby one of said valves is operated automatically through the movement of the other of said valves, and a manually operated valve and connections to shift the time of admission of air to the distributing valve whereby the engine may be started in either direction.

10. In an internal combustion engine, the combination with a plurality of cylinders, of a rotary distributing valve operated in synchronism with the engine and connections to admit air to the cylinders in order, a fuel-valve and connections independent of the distributing valve and its connections to supply fuel to the several cylinders, means whereby one of said valves is operated automatically through the movement of the other of said valves, and a manually operated rotary reversing valve and connections to shift the time of admission of air to the distributing valve whereby the engine may be started in either direction.

11. In an internal combustion engine, the combination of a reversing-air-valve, a distributing valve operated in synchronism with the engine, a fuel-valve, means operated by the movement of the reversing-valve to actuate the fuel-valve, and means operated by the movement of the distributing valve to continue the movement of the fuel-valve in a direction determined by the direction of movement of the distributing valve.

12. In an internal combustion engine, the combination of a reversing-air-valve, a distributing-valve operated in synchronism with the engine, a fuel-valve, means operated by the movement of the reversing-valve to actuate the fuel-valve, and frictional means operated by the movement of the distributing valve to continue the movement of the fuel-valve in a direction determined by the direction of movement of the distributing valve.

This specification signed and witnessed this 16th day of January, A. D., 1909.

GEORGE C. SWEET.
CARL W. WEISS.

Signed in the presence of—
W. B. GREELEY,
ELLA J. KRUGER.